United States Patent [19]

Spangler

[11] Patent Number: 4,741,207
[45] Date of Patent: May 3, 1988

[54] METHOD AND SYSTEM FOR MEASUREMENT OF ROAD PROFILE

[76] Inventor: Elson B. Spangler, 1465 Sodon Lake Dr., Bloomfield Hills, Mich. 48013

[21] Appl. No.: 946,932

[22] Filed: Dec. 29, 1986

[51] Int. Cl.$^4$ ............................................. E01C 23/00
[52] U.S. Cl. ........................................ 73/146; 33/521; 73/178 R
[58] Field of Search .................... 73/146, 105, 178 R; 33/521, 141.5, 142, 338, 287

[56] References Cited

U.S. PATENT DOCUMENTS

| | | | |
|---|---|---|---|
| 3,266,302 | 8/1966 | Spangler et al. | 73/146 |
| 3,983,743 | 10/1976 | Phillips et al. | 73/105 |
| 4,422,322 | 12/1983 | Spangler | 73/146 |
| 4,674,327 | 6/1987 | Swindall et al. | 73/146 |

*Primary Examiner*—Donald O. Woodiel
*Attorney, Agent, or Firm*—Barnes, Kisselle, Raisch, Choate, Whittemore & Hulbert

[57] ABSTRACT

Apparatus and method for use on a measurement vehicle to measure road surface profiles while correcting for surface slope (cross slope and/or grade). Transducers are mounted on the vehicle suspended mass for measuring distance to the road surface and acceleration normal to the road surface as the vehicle is propelled over the road surface. A third transducer is responsive to fixed increments of vehicle travel over the road surface. Surface profile is determined in the spatial domain over each successive incremental distance. Total acceleration of the vehicle in the direction of the slope is measured, from which acceleration due to vehicle motion is subtracted. Elevation is determined as a trigonometric function of slope, and corrections are implemented to the profile signals.

13 Claims, 7 Drawing Sheets

HIGH PASS FILTERED
LOW PASS FILTERED

FIG.5D

TIME

METHOD AND SYSTEM FOR MEASUREMENT OF ROAD PROFILE

The present invention relates to systems and methods for measurement of surface profile, and more particularly to a system and method for measuring the profile of a vehicle travel surface such as a road or runway. Yet more specifically, the invention relates to improvements in the systems disclosed and claimed in U.S. Pat. Nos. 3,266,302 and 4,422,322.

The term "road" is used herein in a generic sense to include highways, streets and the like commonly travelled by automotive vehicles, runways and other surfaces used by aircraft for take-off and landing, railways, and any other type of surface over which a vehicle may travel. The term "slope" is likewise employed in a generic sense to encompass both "cross-slope" of a road surface laterally of vehicle direction, "grade" of a road surface longitudinally of vehicle direction, and the combination thereof.

BACKGROUND OF THE INVENTION

In accordance with the teachings of U.S. Pat. No. 3,266,302, a measurement vehicle is propelled over a road surface, and surface profile (W) is measured as a conjoint function of displacement of the vehicle suspension system (W−Y) and the twice-integrated output (Ÿ) of an accelerometer carried by the vehicle. The disclosed system is described as effecting profile measurement with respect to a plane of reference, defined by inertia of the vehicle, over a total frequency range of road surface undulations determined at lower frequencies by accelerometer response characteristics and at higher frequencies by the vehicle suspension displacement transducer. However, the signal/noise response capabilities of the accelerometer at lower frequencies and any steady-state offset in the electrical output of both transducers, coupled with the described double integration, limit the capabilities of the system to the extent disclosed in the referenced patent.

To overcome the low-frequency response difficulties which inhere in the accelerometer/double-integration technique, it was proposed in Spangler et al, "A Method of Measuring Road Profile", GMR-452, General Motors Corp. (1964) to subject the accelerometer output to a time domain highpass filter for attenuating the low-frequency response prior to time domain double integration. However, since the spatial frequency content of the road profile varies in proportion to vehicle velocity, the provision of the highpass time domain filter causes the measured profile to vary as a function of vehicle speed. This problem was alleviated to some extent by providing a highpass filter with a step-wise variable natural or cutoff frequency thereby to accommodate step-wise differing but constant vehicle speeds.

A further improvement which is prior art to the present invention implemented time domain digital processing techniques in place of, but exactly analogous to, the analog time domain processing techniques proposed in the above-referenced patent and GMR paper. This improvement embodied the capacity for user-input of desired frequency (or wavelength) measuring capability and contemplated vehicle speed. A corresponding highpass filter natural frequency was computed and applied to the accelerometer output in time domain computation of road profile. Although the technique so implemented effectively replaced the earlier step-wise selectable filter with a continuously variable filter, it was still necessary to maintain a constant vehicle velocity during the measurement process.

U.S. Pat. No. 4,422,322 to the inventor herein discloses a system and method which measure road profile in the spatial domain rather then the time domain. Specifically, a transducer is responsive to rotation of a road-contacting wheel for initiating a road profile sample measurement at preselected distance intervals ds along the road surface. Profile W is then measured in accordance with the equation $$W = (W-Y) + \int\int (\ddot{Y}/V^2) ds\, ds, \qquad (1)$$

where the quantity (W−Y) is a measure of displacement of the "sprung inertial vehicle" mass relative to the road surface, Ÿ is acceleration of the "vehicle sprung inertial" mass normal to the road surface, and V is vehicle velocity in the direction of travel. The quantity (Ÿ/V²) is a time-independent measure of spatial acceleration of the sprung inertial mass of the measurement vehicle. Thus, the units of all quantities in Equation (1) are time-independent units of distance. Velocity V may be measured at each distance interval using a suitable transducer, or may be determined by the equation $$V = ds/dt, \qquad (2)$$

where dt is the time required to travel the distance interval ds.

Spatial acceleration given by the expression (Ÿ/V²) is subjected to a highpass filtering operation to attenuate any low-frequency and steady-state components of the transducer signals. However, the filter cutoff frequency, which is in time-independent spatial frequency units of radians per unit length, remains constant during the measurement cycle (following initialization) and produces a road profile measurement having the desired frequency (wavelength) information content regardless of vehicle velocity and/or changes in vehicle velocity.

OBJECTS AND SUMMARY OF THE INVENTION

Although the system and method disclosed in the patent noted in the paragraph immediately preceeding have enjoyed substantial commercial acceptance and success, some problems remain. Where measuring multiple parallel road profiles, for example, independent profilometers can be mounted on laterally spaced sides of a common vehicle. However, the respective profile measurements remain independent, with no established cross-slope relationship therebetween. Therefore, an important road surface parameter remains unknown. An analogous problem lies in determination of fore/aft slope or grade of the road surface. It is a general object of the present invention to provide a system and method of the type disclosed in the noted United States patents for measuring cross-slope and/or grade of the road surface.

A more specific object of the invention is to provide a system and method of the disclosed character which measure spaced profiles of a road surface and automatically determine slope or grade therebetween. A still more specific object of the invention is to provide a system and method of the described character which are adapted to measure and store profile and slope information as hereinabove described substantially independently of vehicle velocity.

In accordance with the present invention, spaced profile measurements are obtained, preferably by spaced independent profilometers mounted on a common measurement vehicle. The measurement vehicle also carries facility for measuring vehicle acceleration due to road slope (i.e. road cross-slope and/or grade), and computation circuitry for determining absolute difference in elevation between the profile measurements. This elevation difference signal may be stored separately, divided between the separately stored profile measurements or added to one of the stored profiles.

In the preferred embodiments of the invention herein disclosed, the elevation difference between the separate profiles is determined by measuring total vehicle acceleration in the slope direction, and subtracting therefrom separately measured acceleration in the slope direction due to vehicle motion. The difference is acceleration of the vehicle in the direction of the slope due solely to gravity. For determining cross-slope, the output of a yaw transducer is subtracted from the output of a transverse accelerometer to provide a signal indicative of lateral vehicle acceleration due solely to a difference in lateral slope. For determining fore/aft road grade, forward vehicle acceleration is subtracted from the output of a longitudinal accelerometer. For small inclinations, these acceleration differences approximate slope angle in radians.

As noted in the above-referenced prior art materials, the profilometer accelerometer outputs are subjected to highpass filtering to improve frequency response, either in the time domain as disclosed in the GMR paper or in the spatial domain as disclosed in U.S. Pat. No. 4,422,322. In accordance with the present invention, the accelerator difference signals due to lateral and/or longitudinal slope are subjected to lowpass filtering complementary to such highpass filtering before being combined with one or both profile measurements. In the preferred embodiments of the invention herein disclosed, all measurements are accomplished and stored in the spatial domain.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
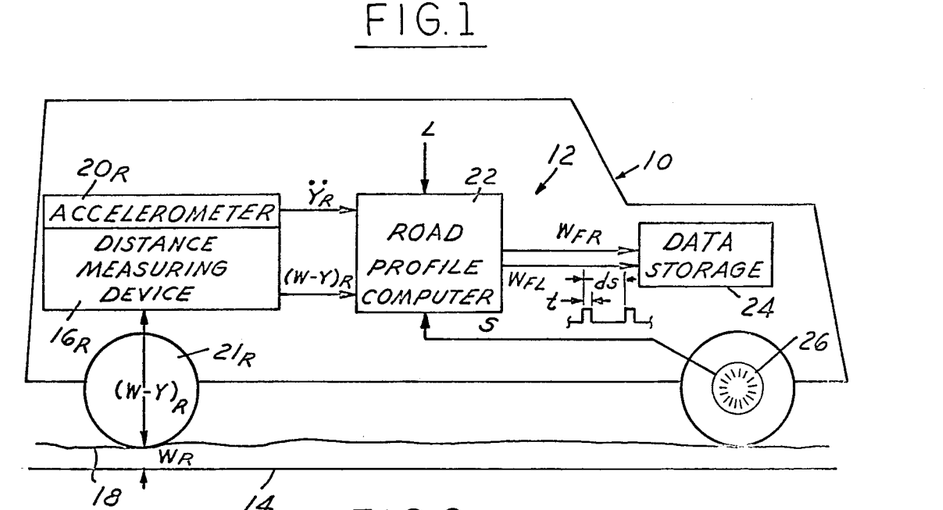
FIGS. 1 and 2 are block diagrams of a vehicle equipped with road profilometer apparatus in accordance with one embodiment of the invention.
Figure 2:
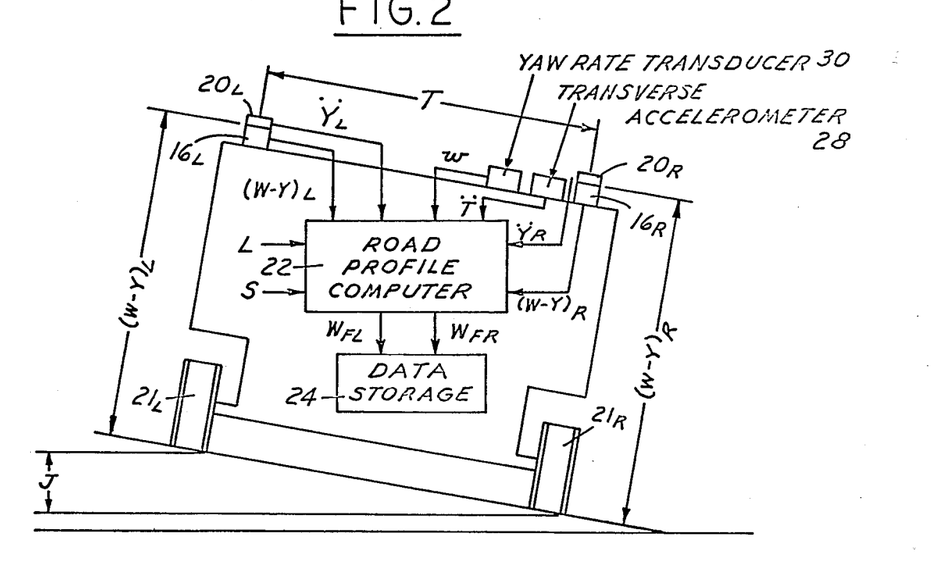

FIGS. 1 and 2 illustrate a vehicle 10 equipped with a road profile measurement apparatus or profilometer 12 in accordance with the invention for measuring road profile along laterally spaced left and right wheel tracks and for measuring cross-slope therebetween. The right-hand profile $W_R$ is measured as a distance from an imaginary plane 14 defined by the inertial element of an accelerometer $20_R$ mounted on the sprung vehicle mass adjacent to the right rear wheel $21_R$. A distance measuring device or transducer $16_R$ is mounted with the accelerometer $20_R$ on the sprung mass of vehicle 10 for measuring the distance $(W-Y)_R$ to the actual road surface 18, which distance varies as a function of the vehicle suspension system (not shown) as vehicle 10 travels over the road surface. Device $16_R$ may take the form of a road following wheel and a variable resistor mounted on a separate towed vehicle. Ultrasonic, optical and other noncontact transducers have also been proposed and may be mounted on vehicle 10 per se.

Accelerometer $20_R$ is mounted with displacement transducer $16_R$ and responsive to acceleration of the sprung mass of the measurement vehicle in a direction perpendicular to inertial reference plane 14 to provide the acceleration signal $\ddot{Y}_R$. Accelerometer $20_R$ and distance transducer $16_R$ direct their respective outputs to a road profile computer 22. The output $W_{FR}$ of computer 22, which indicates profile W suitably spatially filtered to highlight spatial frequency (wavelength) content of interest, is fed to a data storage device 24, which may comprise a strip chart recorder, magnetic tape recorder, etc. A signal L fed to computer 22 indicates maximum desired profile measurement wavelength preselected by the operator. In the preferred embodiments of the invention herein discussed, computer 22 operates exclusively in the spatial domain. Such spatial domain operation is carried out under control of a train of distance pulses S received from a road travel distance measuring transducer 26 suitably mounted to one of the vehicle wheels so as to provide a pulse S of fixed time duration t in response to travel of the vehicle over a predetermined fixed distance ds. Transducer 26 may comprise electro-optical couplers responsive to a suitably apertured disc for providing pulse S of duration t at a rate (1/ds) of twenty per foot (approximately 1.5 pulses per centimeter) of travel, for example. In this example, therefore, each pulse S indicates a fixed distance ds of 0.05 feet (1.524 cm). Time interval between successive pulses S will vary with vehicle speed.

A second accelerometer $20_L$ and a second displacement transducer $16_L$ are mounted above the left rear wheel $21_L$ of vehicle 10 and provide respective signals $\ddot{Y}_L$ and $(W-Y)_L$ to computer 22. Computer 22 computes and feeds to storage 24 a left profile signal $W_{FL}$. To the extent thus far described, the combination of accelerometer $20_R$, device $16_R$, computer 22, storage 24 and transducer 26, and the combination of accelerometer $20_L$, device $16_L$, computer 22, storage 24 and transducers 26, are each identical to the invention disclosed and claimed in U.S. Pat. No. 4,422,322. The disclosure of such patent is incorporated herein for explanation of details of operation, which need not be reported. U.S. Pat. No. 3,266,302 and the GMR paper noted above are of interest with respect to background theory and operation of road profilometry in general, and are incorporated herein for that purpose. It will be appreciated that, while computer 22, recorder 24 and transducer 26 are shared, left and right profiles are measured and recorded essentially independently to the extend thus far described.

In accordance with the embodiment of the invention illustrated in FIGS. 1–2, cross-slope between measured and recorded road profiles $W_{FR}$, $W_{FL}$ is measured and translated into a difference in absolute elevation between the left and right profiles. This elevation difference J (FIG. 2) may be recorded separately at storage 24, may be divided between the recorded profile, or in the presently preferred embodiments herein disclosed, is simply added to one of the profile signals prior to recording—specifically the left track profile $W_{FL}$. For determining such cross-slope and displacement, and additional pair of transducers are provided—namely, a transverse accelerometer 28 and a yaw rate transducer 30. Transverse accelerometer 28 provides a signal T to computer 22 indicative of transverse acceleration produced by the force of gravity due to inclination of vehicle 10 plus transverse acceleration resulting from curvilinear motion of vehicle 10. Yaw rate transducer 30 provides a signal w to computer 22 as a measure of the angular velocity of accelerometer 28 in an average plane parallel to the road surface.

Computer 22 first computes absolute elevation difference J as a function of the equation:

$$J=(W-Y)_R-(W-Y)_L+(T\cdot\tan(K1(T-K2{*}w{*}V)))+K3, \quad (3)$$

where T is transverse distance between left and right accelerometers $20_L$, $20_R$ (FIG. 2), and therefore between left and right profiles, V is vehicle velocity per Equation (2), K1 is a scaling constant to convert transverse acceleration $(T-K2{*}w{*}V)$ into units of transverse angular inclination, K2 is a scaling constant to convert the product of yaw rate w and velocity V into units of transverse acceleration, and K3 is a constant calibrated to set J equal to zero on a known level surface.

Figure 3:
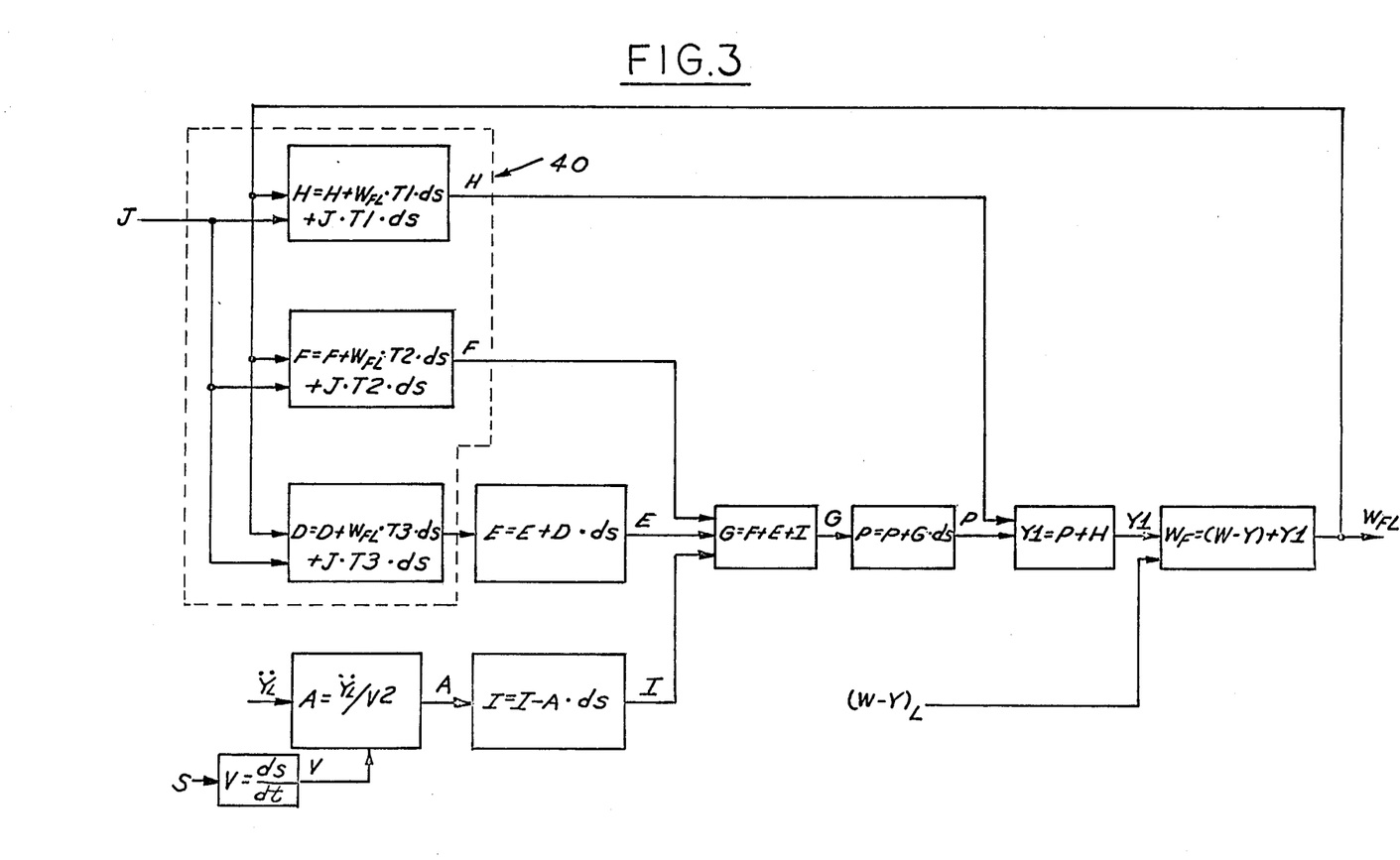
FIG. 3 is a functional block diagram of a digital embodiment of the road profile computer shown in block form in FIGS. 1 and 2.

FIG. 3 is a block diagram of computer 22 for determining left profile $W_{FL}$. (The corresponding diagram for profile $W_{FR}$ is preferably the same as that illustrated in FIG. 4 of U.S. Pat. No. 4,422,322.) FIG. 3 is similar to FIG. 4 of the referenced patent, with the exception of filter network 40. More particularly, the spatial domain highpass filter of the referenced patent is replaced by a combined highpass and lowpass filter 40. The profile signal $W_{FL}$ is thus subjected to spatial domain highpass filtering as in the art, while the offset signal J is subjected to lowpass filtering. Filter poles T1, T2, T3 are given by the equations:

$$T1=2(2\pi/L) \quad (4)$$

$$T2=2(2\pi/L)^2 \quad (5)$$

$$T3=(2\pi/L)^3 \quad (6)$$

It will be noted that the filter poles are common to both the highpass and lowpass filter sections. Thus, the highpass and lowpass filters are complementary.

Figure 4:
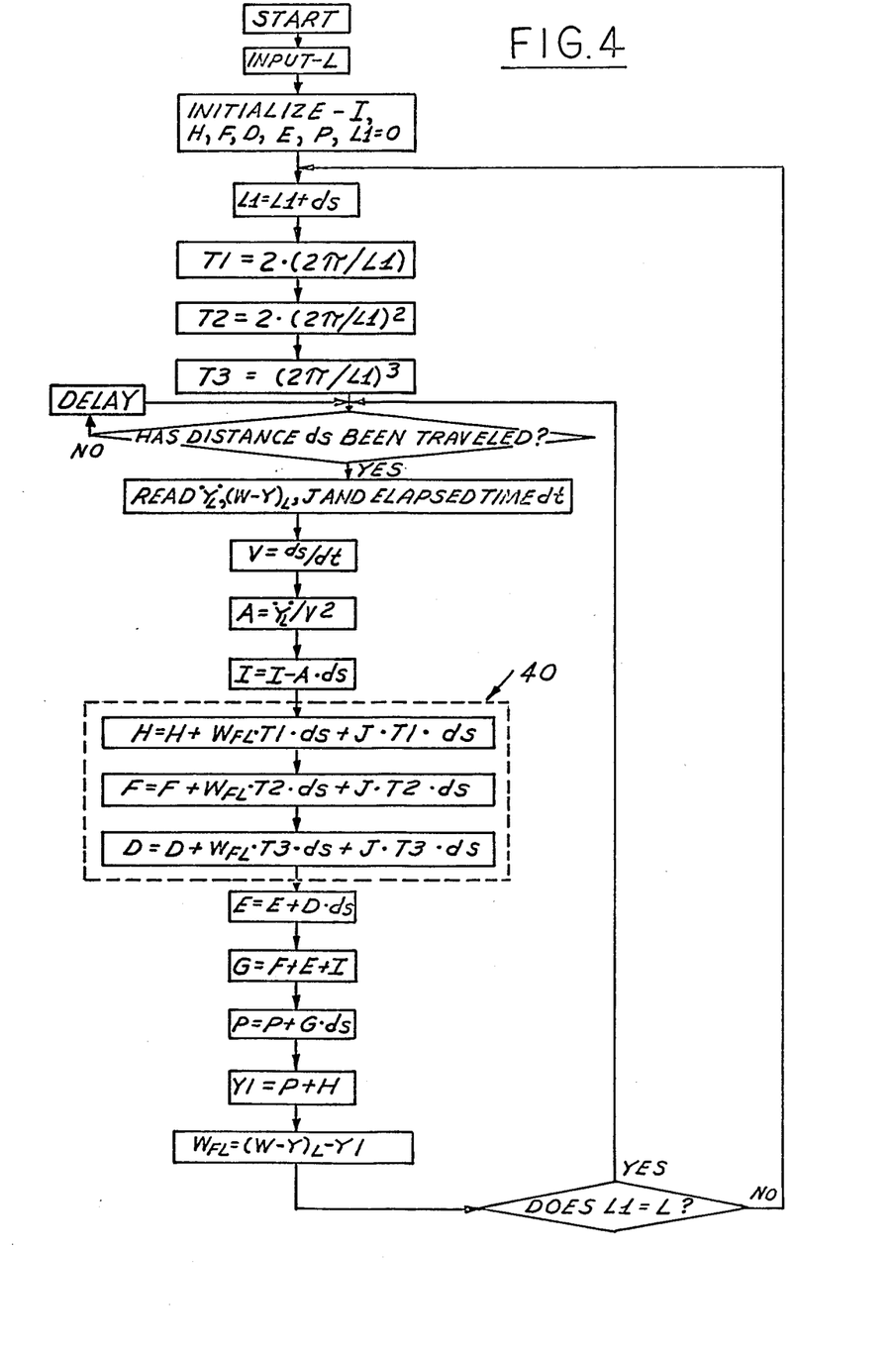
FIG. 4 is a computer program flow chart of a digital embodiment of the road profile computer of FIGS. 1 and 2.

FIG. 4 is a software flow chart for implementing the computation of $W_{FL}$ per the block diagram of FIG. 2. (The corresponding flow chart for $W_{FR}$ would be identical to that at FIG. 3 of U.S. Pat. No. 4,422,322.) A program in BASIC for implementing the process of FIG. 3 is as follows:

```
100     ! START
110     INPUT L
120     I=0
130     H=0
140     F=0
150     D=0
160     E=0
170     P=0
180     L1=0
190     L1=L1+S ! S=ds
200     T1=2*(2*PI/L1)
210     T2=2*(2*PI/L1) ^ 2
220     T3 = (2*PI/L1) ^ 3
230     ! HAS DISTANCE ds BEEN TRAVELED?
240     IF NO THEN 230
250     IF YES THEN 260
260     ! READ ACCELERATION (y2)
270     ! READ DISPLACEMENT (W−Y)
275     ! READ ELEVATION DIFFERENCE (J)
280     ! READ ELAPSED TIME (dt)
290     V=S/T ! T=dt
300     A=Y2/V ^ 2
310     I=I−A*S
320     H=H+W1*T1*S+J*T1*S
330     F=F+W1*T2*S+J*T2*S
340     D=D+W1*T3*S+J*T3*S
350     E=E+D*S
360     G=F+E+I
370     P=P+G*S
380     Y1=P+H
390     W1=W−Y−Y1 ! W1=Wf
400     IF L1=L THEN 230
410     GO TO 190
420     END
```

Figure 5A:
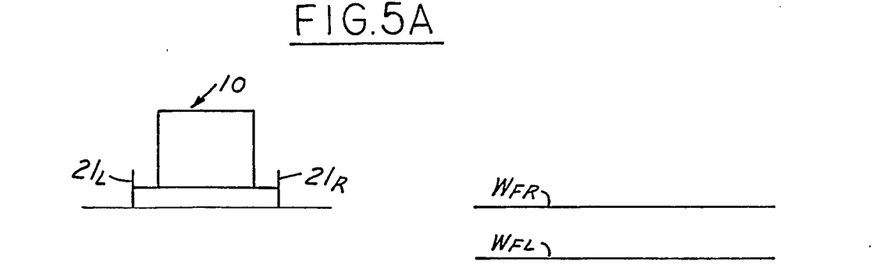
FIGS. 5A–5D are schematic diagrams useful in explaining operation of the embodiment of FIGS. 1–3.
Figure 5B:
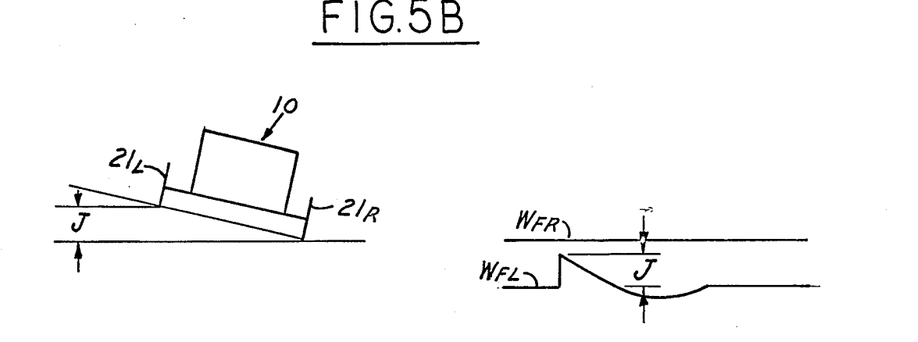
Figure 5C:
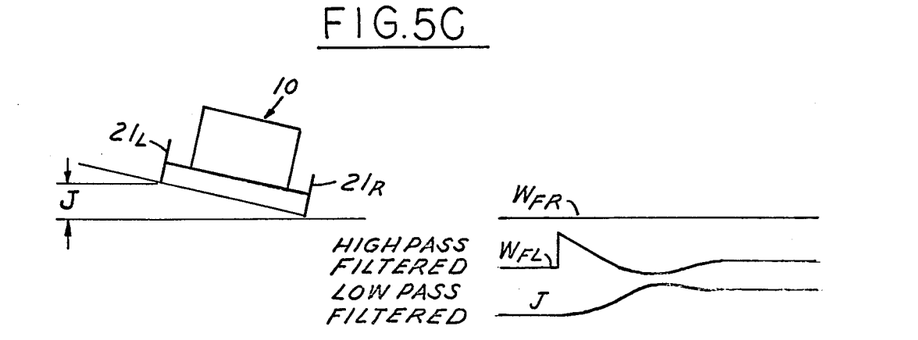
Figure 5D:
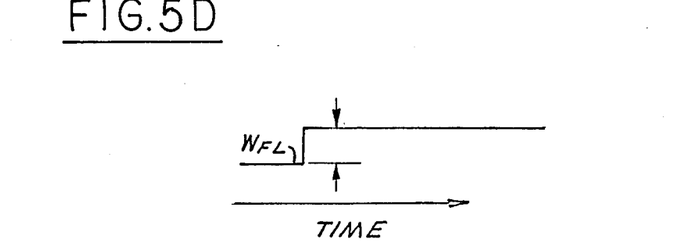

The significance of lowpass filtering elevation difference signal J, as well as the overall significance of cross-slope measurement, will become apparent with reference to FIGS. 5A–5D. In FIG. 5A, both wheels $21_L$, $21_R$ are in a horizontal plane, and profiles $W_{FL}$ and $W_{FR}$ are correspondingly flat. A step input of elevation to the left wheel $21_L$ (FIG. 5B), assuming highpass filtering only, initially displaces $W_{FL}$ by the amount J, but then returns to the amplitude of $W_{FR}$ after the passage of time and/or distance. In FIG. 5C, however, the signal J is subjected to lowpass filtering complementary to the high-pass filtering of $W_{FL}$ as a whole, and is then added thereto, so that the composite or sum $W_{FL}$ illustrated in FIG. 5D accurately reflects the step input to wheel $21_L$.

Figure 6:
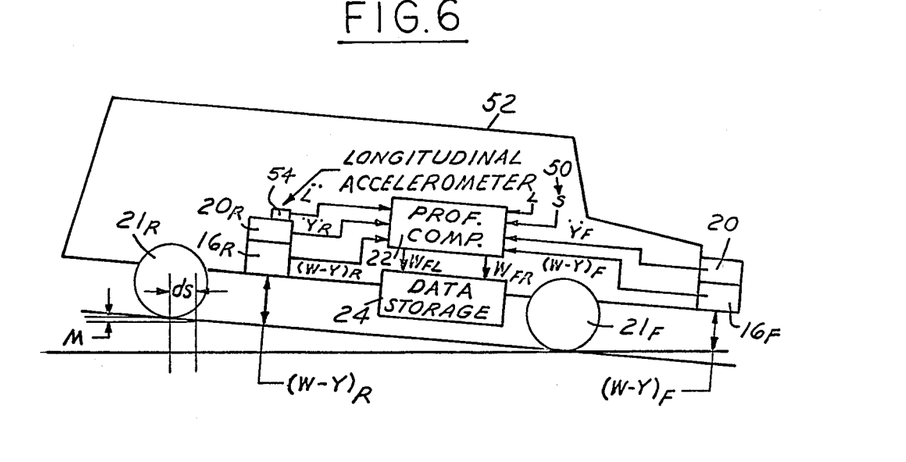
FIG. 6 is a block diagram of a second embodiment of the invention.

FIG. 6 illustrates an embodiment 50 of the present invention measuring fore/aft slope or grade of a road surface. The vehicle 52 has a first distance measuring device/accelerometer pair $16_R$, $20_R$ mounted adjacent to the rear wheel $21_R$, and a second device/accelerometer pair $16_F$, $20_F$ adjacent to the front wheel $21_F$. Profilometer computer 22 receives the device signals $(W-Y)_R$, $(W-Y)_F$ and the accelerometer signals $\ddot{Y}_R$ and $\ddot{Y}_F$, and provides output to storage 24. Computer 22 also receives input signals L and S. A longitudinal accelerometer 54 provides a signal $\ddot{L}$ to compute 22 indicative of the acceleration due to gravity acting on the inclined accelerometer plus acceleration resulting from changes in vehicle velocity. (It will be appreciated that the term "acceleration" includes the negative or "deceleration.")

Incremental grade M, which is the difference in fore/aft elevation over the unit distance ds, is given by the equation:

$$M=(((W-Y)_F-(W-Y)_R+S*\tan(K4(\ddot{L}-dV/dt))+K5)/S)ds \quad (7)$$

where S is longitudinal distance over which the absolute difference in road profile elevation is measured, K4 is a scaling constant for converting longitudinal acceleration ($\ddot{L}-dV/dt$) into units of longitudinal angular inclination, and K5 a calibration constant to set M equal to zero on a known level surface.

Figure 7:
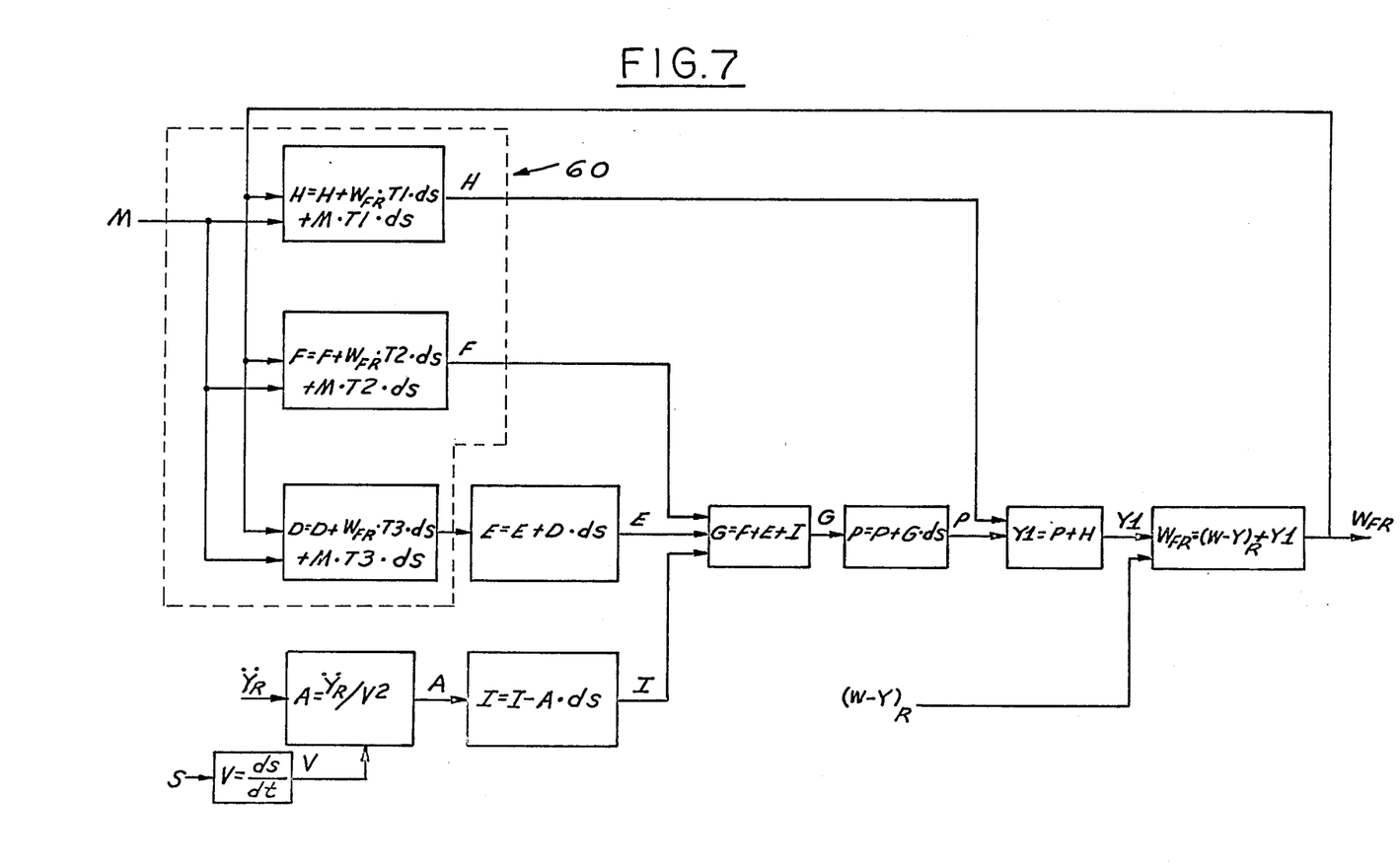
FIG. 7 is a functional block diagram of a digital embodiment of the road profile computer of FIG. 6.
Figure 8:
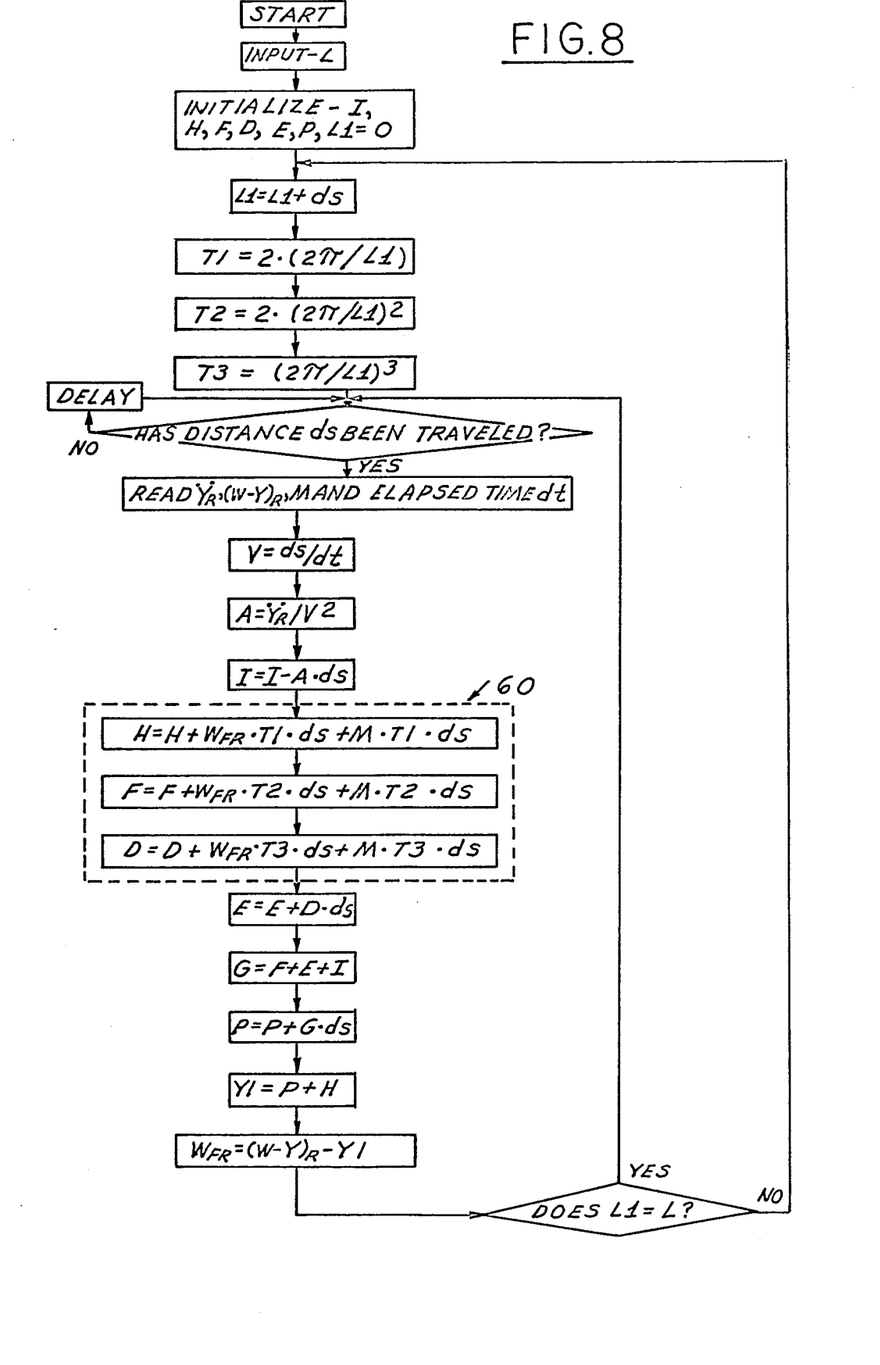
FIG. 8 is a computer program flow chart of the road profilometer computer of FIG. 6.

FIG. 7 is a block diagram for adding longitudinal elevation difference or grade to the right profile signal $W_{FR}$. The identical procedure would be followed for $W_{FL}$. Again, the elevation difference M is subjected to lowpass filtering in a combined highpass/lowpass filter 60 in complement to highpass filtering of $W_{FR}$. Of course, as with cross-slope, elevation difference M could be stored separately. FIG. 8 is a flowchart of software corresponding to FIG. 7. A program in BASIC for accomplishing this result would be identical to that hereinabove, but with "M" substituted for "J".

It will be appreciated, of course, that a preferred embodiment of the present invention would compute both grade M and cross-slope J, and would add both to the left rear wheel profile $W_{FL}$. Following is a modification to the previous program for accomplishing this result, the remainder of the program being as previously disclosed:

```
275  ! READ ELEVATION AND GRADE DIFFERENCES
       (J and M) and
320  H=H+W1*T1*S+(J+M)*T1*S
330  F=F+W1*T1*S+(J+M)*T2*S
340  D=D+W1*T1*S+(J+M)*T3*S
```

Figure 9A:
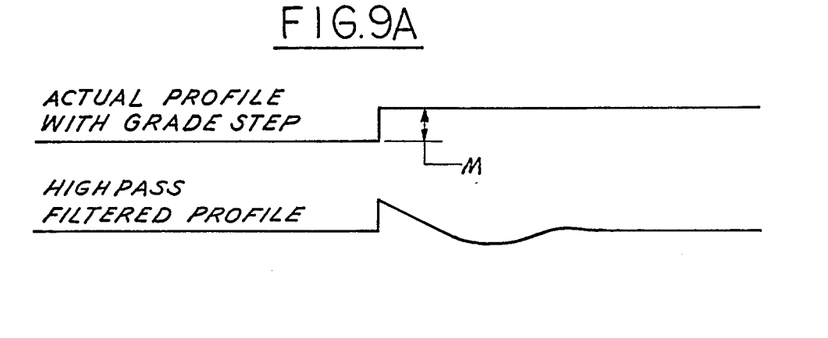
FIG. 9A–9B are schematic diagrams useful in explaining operation of the embodiment of FIGS. 6–8.
Figure 9B:
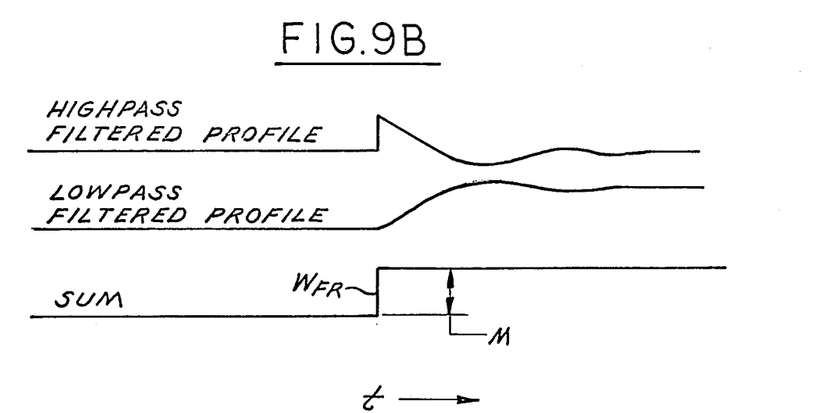

FIGS. 9A and 9B illustrate operation of the grade-measuring aspects of the invention. In FIG. 9A, a step grade change input to rear wheel $21_R$ would initially produce a corresponding change at profile $W_{FR}$, which would thereafter decay to zero with time and/or distance. However, by adding thereto the lowpass-filtered signal M in FIG. 9B, the rear wheel profile $W_{FR}$ is stable at the incremented level.

Although the invention has been described in conjunction with spatial domain operation, which is preferred to reasons set forth in U.S. Pat. No. 4,422,322, the grade and/or cross slope measurements can also be readily performed in the time domain in which the earlier disclosures operated—i.e. U.S. Pat. No. 3,266,302 and the GMR paper.

The measurement of cross-slope provides an absolute transverse reference to be used by multiple distance measuring devices for measuring distance to the road surface (W−Y), which in turn can be used to produce measures of transverse roughness, rutting and topography. The measurement of road surface rutting and transverse topography provides important inputs to the road maintenance and road safety decision-making process. The measurement of road surface rutting and topography provides the information required to accurately compute pavement maintenance costs. The measurement of road surface rutting and topography, combined with road surface grade, provides the information required to evaluate the water drainage capability of the measured road surface topography. A road surface topography that impedes the drainage of road surface water can be a safety hazard by providing the opportunity for water to accumulate in puddles, which can cause a hydroplaning condition during a vehicle braking operation. The measurement of road surface cross-slope also provides the highway engineer with information on the transverse inclination of the road surface, which will allow the correctness of road surface banking in nontangent (curved) sections of the roadway to be evaluated.

The road grade measuring implementation of this disclosure has important applications in the measurement of road pavement topography, road geometrics and overall road survey applications. Pavement grade information, and transverse topography of the pavement, can be combined to compute the water drainage capability of a measured pavement surface. Pavement grade information can also be combined with pavement cross-slope information to compute the geometrics of a pavement surface and to determine if the pavement surface geometrics meet the desired design criteria. Pavement grade, cross-slope, curvature and benchmark data can be combined to compute road survey data which can be used to document the overall geometrics of a large pavement inventory. With cross-slope measurement and grade, road profile can be related to a line through earth-center by application of simple trigonometric functions.

The invention claimed is:

1. In a method of measuring road surface profile which includes the steps of providing a vehicle having a suspended mass adapted to be propelled over a road surface, measuring distance from the suspended mass to the road surface as the vehicle is propelled over the road surface, determining acceleration of said suspended mass perpendicularly of the road surface as the vehicle is propelled over the road surface, and determining road surface profile as a combined function of said distance and acceleration, the improvement for measuring slope of said road surface in a slope direction comprising the steps of measuring total acceleration of said vehicle in said slope direction, measuring motion acceleration in said slope direction due to motion of said vehicle, and determining road surface slope in said direction as a function of a difference between said total acceleration and said motion acceleration.

2. The method set forth in claim 1 wherein said step of determining road profile includes the step of subjecting signals indicative of acceleration of said mass perpendicularly of the road surface to highpass filtering, and wherein said step of determining road surface slope includes the step of subjecting signals indicative of said difference to lowpass filtering complementary to said highpass filtering.

3. In a method of measuring road surface profile which includes the steps of providing a vehicle having a suspended mass adapted to be propelled over a road surface, measuring distance from the suspended mass to the road surface at each of two spaced locations on said vehicle as said vehicle is propelled over the road surface, determining acceleration of said suspended mass perpendicularly of the road surface at each of said locations on said vehicle as said vehicle is propelled over the road surface, and determining road profiles at said locations as respective functions of said distances and accelerations, the improvement for measuring slope of said road surface between said profiles comprising the steps of measuring total acceleration of said vehicle in a direction parallel to said road surface, measuring motion acceleration of said vehicle in said direction parallel to said road surface due solely to motion of said vehicle over said road surface, determining acceleration of said vehicle in said direction parallel to said road surface due solely to gravity as a function of a difference between said total acceleration and said motion acceleration, and determining slope of said road surface between said road profiles as a function of said acceleration difference.

4. The method set forth in claim 3 comprising the additional step of storing signals indicative of said road profiles and said slope.

5. The method set forth in claim 4 wherein said step of determining slope of said road surface profiles comprises the step of determining a difference in elevation of said road surface profiles as a function of said acceleration difference and distance between said locations on said vehicle.

6. The method set forth in claim 5 wherein said step of storing said slope comprises the step of combining said elevation difference with one of said road profiles.

7. Apparatus for measuring road surface profile comprising a measurement vehicle adapted to be propelled over a road surface whose profile is to be measured and including a suspended mass, means positioned at spaced locations on said vehicle with respect to the direction of vehicle travel over the road surface for determining road surface profile as respective combined functions of acceleration perpendicularly of the road surface and distance to the road surface at each said locations, and means for measuring slope of said road surface between said profiles comprising
means for measuring total acceleration of said vehicle in a direction extending between said vehicle locations parallel to said road surface, means for measuring motion acceleration of said vehicle in said direction between said vehicle locations due to motion of said vehicle over said road surface, and means for determining slope of said road surface between said road profiles as a function of a difference between said total acceleration and said motion acceleration.

8. The apparatus set forth in claim 7 wherein said slope-measuring means further comprises means for determining absolute difference in elevation between said road profiles as a function of said acceleration difference and distance between said vehicle locations measured parallel to said surface.

9. The apparatus set forth in claim 8 further comprising means for recording said road profiles and said elevation difference as a function of distance along the road surface.

10. The apparatus set forth in claim 9 wherein said profile-determining means are positioned at spaced locations laterally of direction of vehicle travel, said slope-measuring means measuring cross-slope of the road surface between said road profiles.

11. The apparatus set forth in claim 10 comprising a transverse accelerometer for measuring said total acceleration, a yaw rate transducer for measuring angular velocity of inclination laterally of said direction of travel, and means for determining said motion acceleration as a function of yaw rate times vehicle velocity.

12. The apparatus set forth in claim 9 wherein said profile-determining means are positioned at spaced locations longitudinally of direction of vehicle travel, said slope-measuring means measuring grade of the road surface between said road profiles.

13. The apparatus set forth in claim 12 comprising a longitudinal accelerometer for measuring said total acceleration, and means for determining said motion acceleration as a function of longitudinal velocity of said vehicle.

* * * * *